United States Patent [19]
Gangi et al.

[11] 3,747,253
[45] July 24, 1973

[54] COMBINATION TOOL FOR FISHERMEN

[76] Inventors: Victor J. Gangi, 2244 E. Skillman St., St. Paul, Minn.; Laurice G. Skoog, Box 411, Isle, Minn. 56342

[22] Filed: May 15, 1972

[21] Appl. No.: 253,100

[52] U.S. Cl. .............................. 43/4, 43/5, 294/26
[51] Int. Cl. ..................... A01k 97/00, A01k 97/14
[58] Field of Search ....................... 43/4, 5; 294/26

[56] References Cited
UNITED STATES PATENTS

| 481,464 | 8/1892 | Benson | 294/26 |
|---|---|---|---|
| 2,480,924 | 9/1949 | Heger | 43/4 |
| 2,670,557 | 3/1954 | Pachner | 43/4 |
| 2,877,045 | 3/1959 | Payne | 294/26 |
| 2,924,482 | 2/1960 | Gibson | 294/26 |

FOREIGN PATENTS OR APPLICATIONS

| 12,760 | 0/1906 | Great Britain | 43/5 |

*Primary Examiner*—Louis G. Mancene
*Assistant Examiner*—Daniel J. Leach
*Attorney*—Robert C. Baker

[57] ABSTRACT

A combination tool for fishermen comprising a shank member with a gaff hook on one end and a perforated bowl on the other, plus a conversion assembly shiftable at will between a first and second position. The first position is that for use of the tool as a spoon to remove ice from an ice fishing hole. The second position is that for use of the tool as a gaff hook for lifting caught fish from the hole. The conversion assembly comprises an arm member, a sheath member on one end of the arm member, and means mounting the other end of the arm member in a pivotably shiftable manner to the shank member at a location intermediate the ends of the shank member. The sheath member, in the first position aforenoted, is disposed as a cover over at least the end portion of the gaff hook to render the gaff hook inoperative and substantially non-hazardous. In the second position aforenoted, the sheath is disposed at a location laterally adjacent the shank member between the perforated bowl and the mounting means for the arm member of the conversion assembly. A biasing structure serves to urge the conversion assembly in one or the other of the first and second positions. Hand grip portions along the shank member of the tool are designed to contribute to correct and safe use of the tool.

9 Claims, 6 Drawing Figures

PATENTED JUL 24 1973  3,747,253
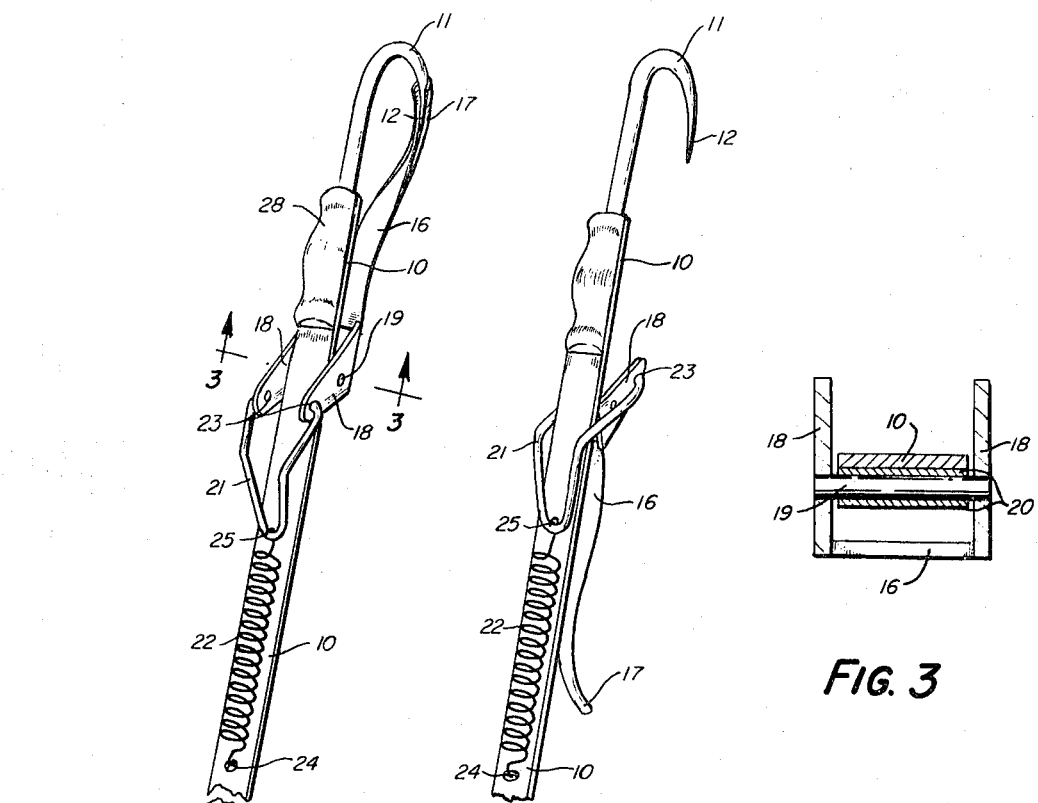
FIG. 1  FIG. 2  FIG. 3
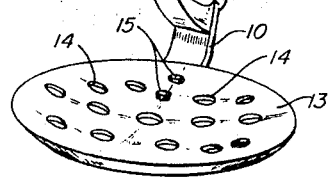
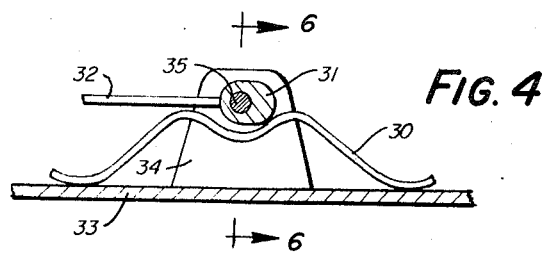
FIG. 4
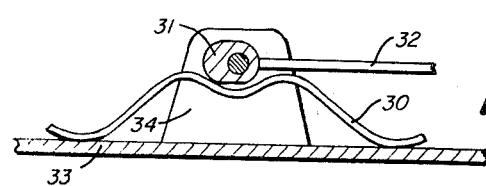
FIG. 5
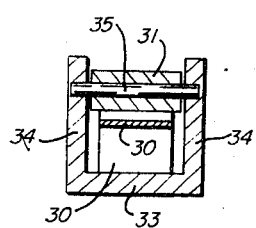
FIG. 6

COMBINATION TOOL FOR FISHERMEN

This invention relates to a combination tool for fishermen, and more particularly to a combination spoon and gaff hook especially useful for ice fishermen.

After drilling or chopping a hole through the ice, the spoon structure of the combination tool hereof is employed to remove fragments of ice and particles of ice from the hole in preparation for fishing. Thereafter, when a fish is caught, the gaff hook alternate structure of the tool hereof is employed, suitably by threading it through a gill of the fish to lift the fish out of the hole.

A tremendous variety of gaff hook structures have heretofore been known. However, no one heretofore, insofar as is known, has ever provided the art with a combination tool for fishermen incorporating both a spoon and a gaff hook.

An especially important feature of this invention is the simple means by which the combination tool is converted from a spoon tool to a gaff hook and vice versa, so that it is safe to use in either manner without significant danger or hazard for the user. This feature is especially important inasmuch as the very character of a gaff hook is not such as to recommend the combination of it with a spoon structure or any other structure to provide a varied combination tool.

The present invention however, solves the problem of the hazard of a gaff hook as a part of a combination tool structure, and provides the art with a simplified convertible tool which is safe to use either as a spoon or gaff hook.

The new combination tool comprises a shank member with a gaff hook on one end and a perforated bowl on the other end, plus a conversion assembly shiftable at will between a first and second position. The first position is that for use of the tool as a spoon; and the second position is that for use of the tool as a gaff hook. The conversion assembly itself comprises an arm member, a sheath member on one end of the arm member, and means at the other end of the arm member for mounting it in a pivotably shiftable manner to the shank member at a location intermediate the ends of the shank member. The sheath member, in the first position for the conversion assembly, is disposed as a cover over at least the end point portion of the gaff hook, thereby rendering the gaff hook inoperable and providing a safety covering for it during use of the tool as a spoon. In the second position, the sheath member is disposed at a location laterally adjacent the shank member between the mounting means for the arm member of the conversion assembly and the perforated bowl at the opposite end of the shank member.

Handle means or hand grip structures are suitably provided at or near shank locations proximate to the end structures on the shank; and preferred hand grip means foster safe use of the tool.

Biasing for the conversion assembly serves to urge that assembly in one or the other of the first and second positions for the use of the tool either as a spoon or as a gaff hook. Spring-like type biasing is preferred.

Other structural and functional characteristics and benefits of the new combination tool of the invention will become evident as this description continues.

The invention will be described by reference to a drawing, made a part hereof, wherein:

FIG. 1 is a schematic perspective view, partially broken away, of a preferred embodiment for the combination tool, the showing being that for the first position of the conversion assembly (that is, for use of the tool as a spoon);

FIG. 2 is a partial schematic perspective view of the tool illustrated in FIG. 1, the showing being that for the second position of the conversion assembly (that is, for use of the tool as a gaff hook);

FIG. 3 is a fragmentary cross-sectional view taken on line 3—3 of FIG. 1;

FIGS. 4 and 5 are fragmentary schematic sectional views along the length of a shank member, illustrating an alternate embodiment for the biasing means of the conversion assembly (the showing in FIG. 4 being illustrative of that for the first position of the conversion assembly, with the tool adapted for use as a spoon; and the showing in FIG. 5 being that for the second position of the conversion assembly, with the tool adapted for use as a gaff hook); and FIG. 6 is a fragmentary cross-sectional view taken along line 6—6 of the article illustrated in FIG. 4.

Referring to the drawing, particularly FIGS. 1, 2, and 3, the combination tool comprises a base shank member 10, suitably of varied length as desired but preferably at least one or two feet in length up to possibly about four feet. It is properly characterized as an elongated member. The shank member may be formed either to be flat or round or angular in cross section along its length, with a substantially flat or strip-like shank member being suitable.

A gaff hook 11 is fixed at one end of the shank member; and this gaff hook suitably extends in an arc of curvature with the point or end portion 12 of the gaff hook more or less directed back in the general direction toward the direction the shank extends from the gaff hook structure.

At the other end of the shank member 10 is attached a perforated bowl 13, preferably of shallow concave character, with the perforations 14 (in any suitable design such as slits or round holes or holes of other shape) extending through the concave body of the bowl. Further to be noted is that the bowl 13 extends laterally from the shank in a direction opposite from the lateral direction taken by the gaff hook 11 off the shank 10. This arrangement is preferred over that of mounting the gaff hook 11 and bowl 13 so that both laterally project or extend from the shank 10 in the same general direction. By positioning the bowl 13 so that it projects or extends somewhat laterally from the shank in a direction opposite the lateral extension or projection of the gaff hook 11 from the shank, the structure at either end of the shank is least apt to cause problems for a user when the structure at the opposite end is being employed for its function. An additional benefit for this arrangement is gained in terms of convenient hand grip functional characteristics, especially when the tool is employed as a spoon, as will be described hereinafter.

As illustrated in FIG. 1, the perforated bowl 13 is preferably mounted to the shank 10 in such a manner that the bowl occupies a position with respect to the handle or shank comparable to that for a ladle, instead of comparable to that of a tablespoon. In other words, the lateral projection of a bowl 13 from the shank 10 preferably is at an angular relationship to the shank 10 somewhere between about 100° and 170°, with about 120° up to 150° being most preferred for convenient ice removal from a ice fishing hole. Suitably the shank 10 is curved at the bowl end to pass underneath the bowl member; and the bowl 13 is fastened as by rivets 15 to the shank. Such a structural arrangement is especially preferred when the combination tool is formed out of metal material such as iron, steel, aluminum, or other metal. Alternately, the combination tool may be formed, at least in part, out of organic plastic materials, if desired; and molding of such materials (or for that matter, the casting of metal) may oviate the need for riveting or welding of bowl 13 to shank 10.

A critical structure of the invention is the conversion assembly which is shiftable at will between a first position as illustrated in FIG. 1 and a second position as illustrated in FIG. 2 of the drawing. This conversion assembly comprises an arm member 16, with a sheath member 17 on one end of the arm member. The sheath member suitably is a groove piece or strip which in cross-section is approximately U-shaped. In the first position illustrated in FIG. 1, the sheath 17 is disposed as a cover over at least the end pointed portion 12 of the gaff hook. Thus, the sheath member 17 serves as a protective covering over the gaff hook 11 (at least its dangerous end 12) when the tool is employed as a spoon for dipping ice from an ice fishing hole.

The end of the arm member 16 not carrying the sheath 17 is mounted in a pivotably shiftable manner to the shank member 10 at a location intermediate the ends of the shank member, and preferably at a location within the end third of the shank member nearest the hook 11.

The pivotable mounting of the arm 16 to the shank 10 suitably is accomplished by providing bracket extensions 18 off the arm member 16, with a pin or shaft 19 extending between the bracket extensions 18. A sleeve structure 20 (see FIG. 3) or other journal-forming structure is fixed to the shank member 10 (on the rear side of the shank as viewed in FIGS. 1 and 2); and the pin 19 between the bracket extensions 18 off the arm member 16 extends through the sleeve member 20. As illustrated in FIG. 1, the bracket extensions 18 off the arm member 16 actually project sufficiently to extend as ear members or parts on the opposite side of the shank member 10 from that of the side on which the arm member 16 is located. A link 21 is flexibly connected as at numeral 23 to the bracket means 18 off the arm member. That is, link 21 is flexibly connected or attached for pivot action at numeral 23 to the extended portion of the bracket means 18 off the arm member 16. This link 21 serves as a convenient member for attachment or connection to one end of a coiled spring 22. The connection is identified by numeral 25. The other end of the coiled spring 22 is suitably fixed to the shank member 10 by any suitable means such as by hooking it through a hole 24 in the shank member.

Ideally, the bracket extensions or means 18 off the arm member 16 extend in a generally angular direction away from arm member 16, but not in true alignment with it. Brackets 18 preferably extend in an angular direction away from the arm member 16 somewhere between about 70° and 170° from the general direction of the arm member. Thus, as the conversion assembly is shifted from the first position illustrated in FIG. 1 into the second position illustrated in FIG. 2, the bracket extensions 18 off the arm member are moved from a location laterally opposite the shank 10 from the side of the shank on which the arm member 16 is located to a position laterally opposite the shank on the same side of the shank on which the arm 16 is located. This, in turn, shifts the flexible connection 23 of the link 21 to the bracket means 18 from the side of the shank 10 opposite the side occupied by the arm 16 to the side of the shank 10 occupied by the arm 16. Simultaneously, the flexible connection 23 moves through a mid-center point between the extremes of the two positions illustrated in FIGS. 1 and 2. A plane aligned with pivot shaft or pin 19 (and within which pin 19 lies), and passing through the connection 25 of spring 22 to link 21, will change in orientation (about pivot shaft 19) as the conversion assembly is shifted from one position to the other; and it is within this changing plane that the mid-center point (between the extremes of the positions illustrated in FIGS. 1 and 2) is reached. The angular shape of link 21 (and also its bifurcated character allowing it to pass on both sides but opposite sides of shank 10) contributes to this result. The arrangement causes the conversion assembly to be always biased, either into a first position as illustrated in FIG. 1 or into a second position as illustrated in FIG. 2. The interfunctional arrangement further causes the flexible connection 23 between the link 21 and the bracket 18 to pass on opposite sides of the shank member as the conversion assembly is shifted between the first and second positions.

Handle means 26 of any suitable contour is provided on the shank member 10 at a location proximately adjacent the bowl 13. If desired, this handle means may be padded and grooved or contoured to provide finger recesses or the like for the convenience of hand gripping. An important point with respect to the handle means 26 when the device is used as a gaff hook is that an abutment member 27 serves as part of the composite gaff hook handle. Abutment member 27 projects laterally from the shank 10 at the handle location adjacent or proximate to the perforated bowl 13 and in substantially the same lateral direction as bowl 13. This abutment member 27 serves as a means for protecting the heel of one's hand from the edges of the bowl 13 when the tool is used as a gaff hook. Further, an abutment member 27, projecting laterally from the shank, aids not only in protecting one's hand from the edges of the bowl 13, but also serves as a member assisting control of the tool in axial orientation of shank 10 as the tool is used in hooking a fish. Thus abutment member 27 permits greater dexterity of axial control of the tool as it is gripped at the handle means 26 for gaff hook use.

A preferred structure for the arm member 16, as the arm member 16 is viewed in the illustration of the first position in FIG. 1, is that of a contouring or curving of the arm member 16 toward the shank structure 10 in portions of the arm member 16 between the pivot 19 mounting for it and the sheath member 17 covering hook 11. This contour, while optional, does contribute to the comfort of the hand gripping of the tool as it is used to strain or spoon out particles of ice from an ice fishing hole. If desired, arm 16 may be provided with a padded finger grip area. In recommended gripping, the arm member 16 serves cooperatively (in the position illustrated in FIG. 1) with the shank member 10, at shank locations lateral to the arm member 16, to provide a hand grip portion or handle portion 28. To be recognized is that one preferably grips the tool (as it is used to spoon out ice) by placing the palm of one's hand over the shank grip portion 28 (at the location of the shank 10 adjacent the arm member 16 when it is in the first position illustrated in FIG. 1). One's fingers then extend down about and grip the arm member 16. Thus, the gripping of the tool to spoon out ice causes one's hand to act as a vice drawing arm 16 toward shank grip portion or handle means 28. This, in turn, pulls the sheath member 17 against the pointed end of the gaff hook as the device is being used as a spoon. Thus, the dangerous character of a gaff hook being moved about as the device is used to spoon out ice is essentially totally obviated, not only by the sheath covering over the pointed end of the gaff hoof, but also by the fact that the user's hand is gripping the tool, specifically both the arm member 16 and the shank portion 28 of the tool, so that the user's hand itself is constantly keeping the sheath 17 in position as a covering over the pointed end 12 of the gaff hook 11 during use. This safety feature is inherent in the special two part hand grip arrangement, as noted.

Referring to FIGS. 4, 5 and 6, alternate biasing means suitably may be formed by a combination of a leaf spring member 30 and a cam member 31. The mounting means of arm member 32 (which is comparable to arm 16) in a pivotably shiftable manner to a shank 33 (which is comparable to shank 10) may be located at a point along the shank 33 where two brackets 34 are provided to extend laterally outwardly from the shank 33. The arm member 32 for the protective gaff hook sheath (not shown in FIGS. 4,5, and 6) may be fixed to an axis shaft or pin 35, with an eccentric cam structure 31 integral or united to the axis shaft or pin 35. The axis 35 is journaled in brackets 34. Underneath the axis shaft 35 is positioned a leaf spring of approximately inverted "W" shape. The out-stretched legs or arms of the "W" shape for the leaf spring are positioned to abut against the shank member 33. The central portion of the leaf spring 30 has a contour or dip in it for receiving the displacement effected by cam 31 as arm 32 is shifted between positions. The leaf spring 30 is substantially relaxed as the arm member 32 of the conversion assembly is positioned in either the first position (for example, as viewed in FIG. 4) or the second position (for example, as viewed in FIG. 5). But at intermediate locations, the leaf spring 30 is well depressed toward the shank 33 by the cam 31. Thus arm 32 is always biased in either its first or second position. In the structure shown in FIGS. 4, 5 and 6, the biasing assembly and mounting assembly for the shiftable arm 32 are suitably located on the same lateral side of the shank 33 as the arm member 32.

It will be appreciated that several modifications of the specific design features illustrated herein are permissible while still retaining the essential convenience and safety features and functional performance of the special convertible tool of this invention. As one illustration of this, the axis for pivotal shifting of the arm 16 of the conversion assembly might extend through the shank 10, with arm 16 bifurcated to connect with the axis.

That which is claimed is:

1. A combination tool for fishermen comprising a shank member, a gaff hook on one end of said shank member, a perforated bowl on the other end of said shank member, and a conversion assembly shiftable at will between a first and second position, said first position being that for use of said tool as a spoon and said second position being that for use of said tool as a gaff hook, said conversion assembly comprising an arm member, a sheath member on one end of said arm member, and means mounting the other end of said arm member in a pivotably shiftable manner to said shank member at a location intermediate the ends of said shank member, said sheath member in said first position being disposed as a cover over at least the end portion of said hook and in said second portion being disposed at a location laterally adjacent said shank member between said mounting means and said bowl.

2. The tool of claim 1 additionally comprising handle means on said shank member at a location proximate said bowl.

3. The tool of claim 2 wherein said handle means comprises an abutment member projecting laterally from said shank.

4. The tool of claim 1 additionally comprising means biasing said conversion assembly in one or the other of said first and second positions.

5. The tool of claim 4 wherein said biasing means comprises a spring member.

6. The tool of claim 5 wherein said spring member comprises a coil spring attached at one end to said shank and at the other end to a link flexibly connected with a bracket off said arm member, said flexible connection of said link to said bracket being disposed to pass on opposite sides of said shank member as said conversion assembly is shifted between said first and second positions.

7. The tool of claim 5 wherein said spring member comprises a leaf spring and said mounting means for said arm member comprises a cam means coacting with said leaf spring.

8. The tool of claim 1 wherein said arm member is contoured and serves cooperatively with said shank member at shank locations lateral to said arm member to provide a hand grip when said shiftable assembly is in said first position.

9. The tool of claim 1 wherein said bowl and said gaff hook extend laterally from said shank member in opposite directions.

* * * * *

UNITED STATES PATENT OFFICE
CERTIFICATE OF CORRECTION

Patent No. 3,747,253        Dated July 24, 1973

Inventor(s)  Victor J. Gangl et al.

It is certified that error appears in the above-identified patent and that said Letters Patent are hereby corrected as shown below:

On the cover sheet [19] "Gangi et al." should read -- Gangl et al.--; [76] "Victor J. Gangi" should read -- Victor J. Gangl --.

Signed and sealed this 1st day of January 1974.

(SEAL)
Attest:

EDWARD M. FLETCHER, JR.
Attesting Officer

RENE D. TEGTMEYER
Acting Commissioner of Patents